FIG. 2.

INVENTOR
WILLIAM. W. CAMP.

INVENTOR
WILLIAM W. CAMP

INVENTOR
WILLIAM W. CAMP.

UNITED STATES PATENT OFFICE.

WILLIAM WATSON CAMP, OF STRATFORD, ONTARIO, CANADA.

PRESS.

1,349,318.　　　　　　　　Specification of Letters Patent.　　Patented Aug. 10, 1920.

Application filed January 15, 1920.  Serial No. 351,559.

*To all whom it may concern:*

Be it known that I, WILLIAM WATSON CAMP, a subject of the King of Great Britain, of the city of Stratford, in the county of Perth, in the Province of Ontario, Canada, have invented certain new and useful Improvements in Presses, of which the following is the specification.

My invention relates to improvements in presses and the object of the invention is to devise a press for the purpose of compressing pulverized material into a continuous sheet as it is fed through the press and which will develop the high pressure required and which is particularly adaptable for compressing peat into the form required for fuel and it consists essentially of the arrangement and construction of parts as hereinafter more particularly explained.

In the drawings like characters of reference indicate various parts in each figure.

1 indicates the substructure of concrete in which is formed a pit 2 in the base of which are formed longitudinally extending parallel channels 3 and 4 for a purpose which will hereinafter appear.

5 and 6 are cross beams which extend across the pit at suitable distances apart and from which extend supporting beams 7 and 8 at the left hand end of the pit 2 and supporting beams 9 and 10 located at the right hand end of the pit.  11 is a spacing block which is carried by the cross beam 6.  12 is a beam supported upon one end upon the spacing block 11 and at the opposite end upon the beam 5.  The beam 12 forms the bed of the machine and such beam tapers from the right hand end toward the left hand end, the right hand end being of greater thickness and the upper face of the beam horizontal.  13 and 14 are standards which extend upwardly from the beam 5 in proximity to each end thereof.  The standards 13 and 14 are reinforced and held in position by suitable bracing standards 16 which I will not describe in detail as they may be of any form desired to fulfil the required purpose.

The upper end of each beam 13 and 14 is provided with journaled orifices 17.  18 and 19 and standards secured to the bed beam 12 and extend upwardly therefrom.  The standards 18 and 19 are in the form of channel irons through which extend vertical rods 20 secured at their lower ends in the beam 12 and spaced apart within the channel iron. 21 is a cap plate which rests upon the top of each standard 18 and 19 and through which the rods 20 extend.  22 is the pressure beam which is provided at its right hand end with outwardly extending wings 23 the upper and lower surfaces of which are slightly convexed so as to allow of a slight up and down swinging movement of the pressure beam 22.  The upper ends of the rods 20 extending through the standards 18 and 19 are tied together by a casting 24 secured to the rods 20 of the standard 18 and a similar casting secured to the rods 20 of the standard 19 such casting being provided with upwardly extending flanges 25 which are tied together by the tie rods 26.

The opposite end of the pressure beam 22 is provided with laterally extending wing projections 27 which normally rest upon the projecting portions 28 when the beam is in its normal or inoperative position.

29 is an equalizing beam the function of which is to prevent the twisting of the pressure beam 22 due to the unevenness of the material fed through the machine. The equalizing beam 29 is provided with trunnions 30 journaled in the orifices 17 of the standards 13 and 14. The lower face of the equalizing beam 29 is recessed at 31 to receive fulcrum projections 32 which form part of the pressure beam 22 and which bear against the base of the recess 31.

The base beam 12 is provided with vertical channels 33 and 34 depending therefrom at each side of the beam and located in proximity to the standards 13 and 14 and beneath the free end of the equalizing beam 29. 35 is a slide piece fitting within the lower portion of each channel 33 and 34. 36 is a slide piece fitting within the upper portion of each channel 33 and 34. The brackets 33 are provided with orifices 37 for a purpose which will hereinafter appear. 38 is a bearing recess formed in each slide piece 35. 39 is a bearing recess formed in each slide piece 36. 40 is a rod which extends through the orifices 37 of the bracket 33. 41 are sleeves provided with upper and lower bearing recesses 42 and 43, the sleeves 41 being slidable upon the rod 40. 44 and 45 are nuts screwed onto each end of the rod 40. 46 and 47 are opposing casing members having central orifices through which the rod 40 extends. 48 are compression springs for holding the members 46 and 47 apart. 49 and 50 are bars having rounded ends fitting respectively within the recesses 38 and 39 and 42 and 43.

The outer end of the equalizing beam 29 is provided at each side with a convex bearing portion 51. 52 is a bar provided with a concaved recessed portion 53 fitting the convexed portion 51. 54 and 55 are tie rods which extend at their lower ends through the lower portion of the slide piece 35 located at each side of the press and at the upper ends through the bars 52. The rods 54 extend freely through the orifices formed in the equalizing beam 29 as indicated by dotted lines in Fig. 1.

It will thus be seen that when there is any tendency to lift the pressure beam 22 the movement is transmitted by means of the projection 32 to the equalizing beam 29 the free end of which is thereby lifted drawing upon the rods 54 and 55. The upward movement of the rods 54 and 55 raises the slide pieces 35 in the slideway 33 thereby carrying the bars 49 and 50 toward a parallel position and thereby forcing the sleeves outwardly from each side of the machine against the casing members 47 thereby tending to compress the compression springs 48.

56 is a lower endless conveyer formed by a series of sections 57 hingedly connected together at 58. The right hand end of the conveyer 56 is supported by a hexagonal spider wheel 59 which is mounted upon the shaft 60 carried in bearings 61 which bearings are carried upon the beams 9 and 10 of the supporting structure. The wheel 59 is an idler wheel and only serves to support that end of the conveyer. 62 is a track frame located at each side of the machine the horizontal portion 63 being supported by the standards 13 and 14. 64 is a standard extending upward from each longitudinal arm 7 and 8. On the upper end of the standard bars 64 are supported the outer ends of the horizontal track portion 63. 65 is a curved track portion which forms a continuation of the track portion 63, such curved portion extending downwardly to the inside of the beams 7 and 8. 66 is an inclined track portion carried by each beam 7 and 8 the lower end extending in proximity to the lower end of the track portion 65 and the upper end extending in proximity to the track portion 63. 67, 68, 69 and 70 are a series of cross shafts on which are mounted flange rollers 71. The rollers 71 travel upon the track portions 63 and 65 and 66 the flange of the roller bearing against the inside edge of the track portions. 72 is a spacing sleeve which is mounted upon each shaft 67, 68, 69 and 70 to the inside of each roller 71. 73 is a collar mounted upon each shaft 67 to 70 directly to the inside of the spacing sleeve 72. The collars 73 are freely mounted upon the shafts and are held in their proper longitudinal position upon the shafts by the sleeves 74, each spacing sleeve 74 extending between the collars at each end of the shaft.

75 and 76 are chains, the chain 75 connecting the collars 73 located at one end of the shafts 67 to 70 together, and the chain 76 connecting the collars 73 at the opposite end of the shafts 67 to 70 together. By this means the shafts are held so that they cannot move beyond a given distance apart but by which they may move inward toward each other under certain conditions.

In order that the movement of the chains 75 and 76 may be equal on each side of the machine I provide a cross shaft 77 upon which are mounted sprocket wheels 78 which engage the chains 75 and 76 so as to insure that the forward travel of the chains is equal.

Figure 8:
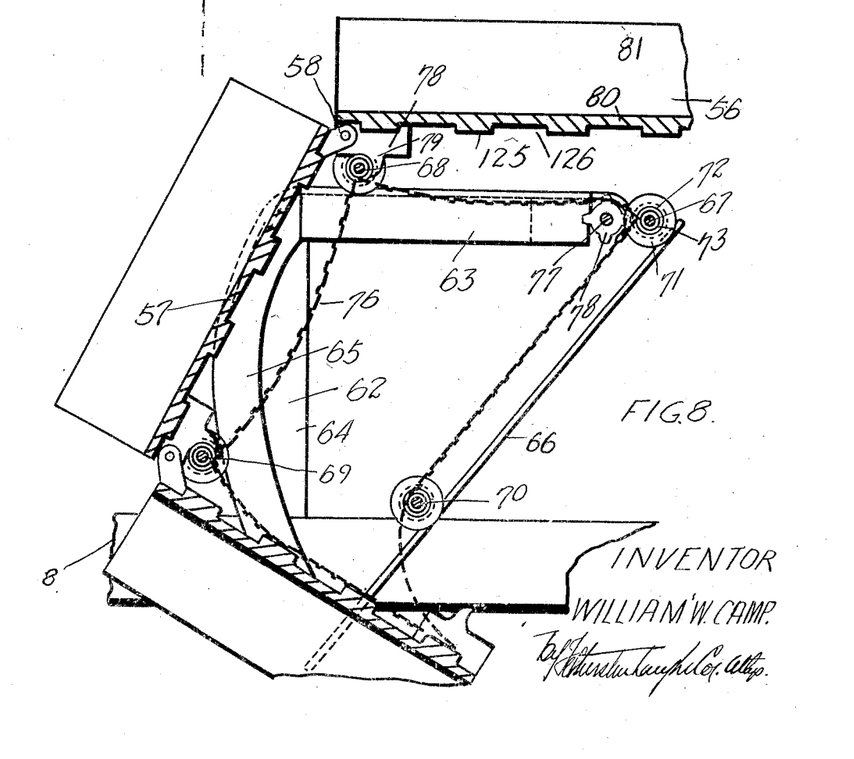
Fig. 8 is an enlarged sectional view through the left hand portion of the conveyer and showing the traveling support therefor.
Figure 11:
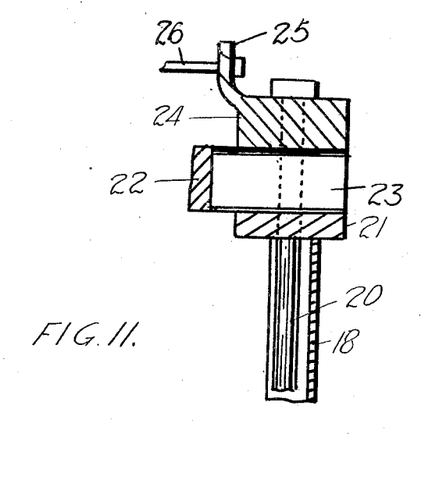
Fig. 11 is a sectional detail of the pressure beam support.
Figure 12:
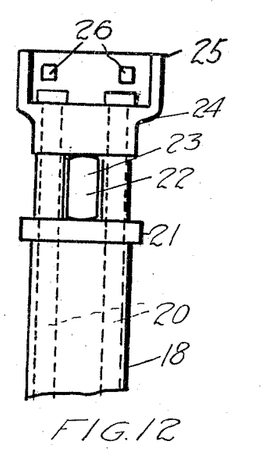
Fig. 12 is a front elevation of Fig. 11.
Figure 13:
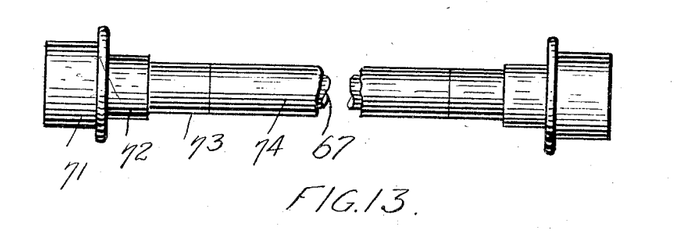
Fig. 13 is an enlarged detail view of one of the carrying shafts and adjacent parts which co-act with the lower endless conveyer to form the supporting means.

One member of the hinge connection between the sections 57 of the endless conveyer 56 is in the form of a rectangular block 78 from which depends a hook projection 79 adapted to engage the sleeve 72 freely mounted upon each of the shafts 67 to 70. The rectangular block 78 when the hook 79 is brought into the engaged position rests upon the top of the sleeve 72 so as to support the corresponding end of the section 57 as it is carried around the track ways 63 and 65. As the lower conveyer 56 is driven by means which I will hereinafter describe and as each section 57 of the conveyer approaches the left hand end of the machine, the hooks 79 of one section engage the sleeves 72 hereinbefore described and the travel of the conveyer carries the shaft 68 and roller 71 mounted thereon around the track ways as clearly indicated in Fig. 8, the roller 71 of the shaft 68 traveling down the curved track 65 until it drops into engagement with the inclined track 66. When brought into this position the weight of the roller holds that portion of the chain taut which extends between it and the next preceding roller. By the above movement of the shaft 68 the shaft 67 is carried up on to the track 63 and into position to be engaged by the next succeeding section of the conveyer. As the shaft 67 travels up on to the track 63 it draws the next successive roller up the track 66 so as to be in readiness to be engaged by a section of the conveyer 56.

I will now describe the construction of the sections forming the lower endless conveyer 56 and the means by which this conveyer is driven.

Figure 1:
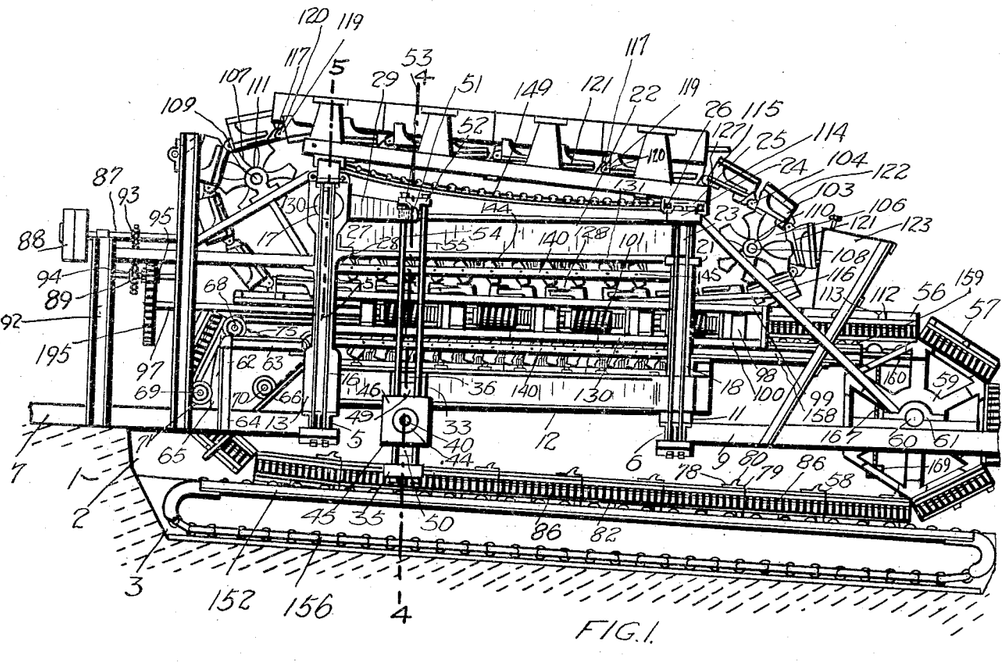
Figure 1, is a side elevation of my machine showing the substructure in section.
Figure 4:
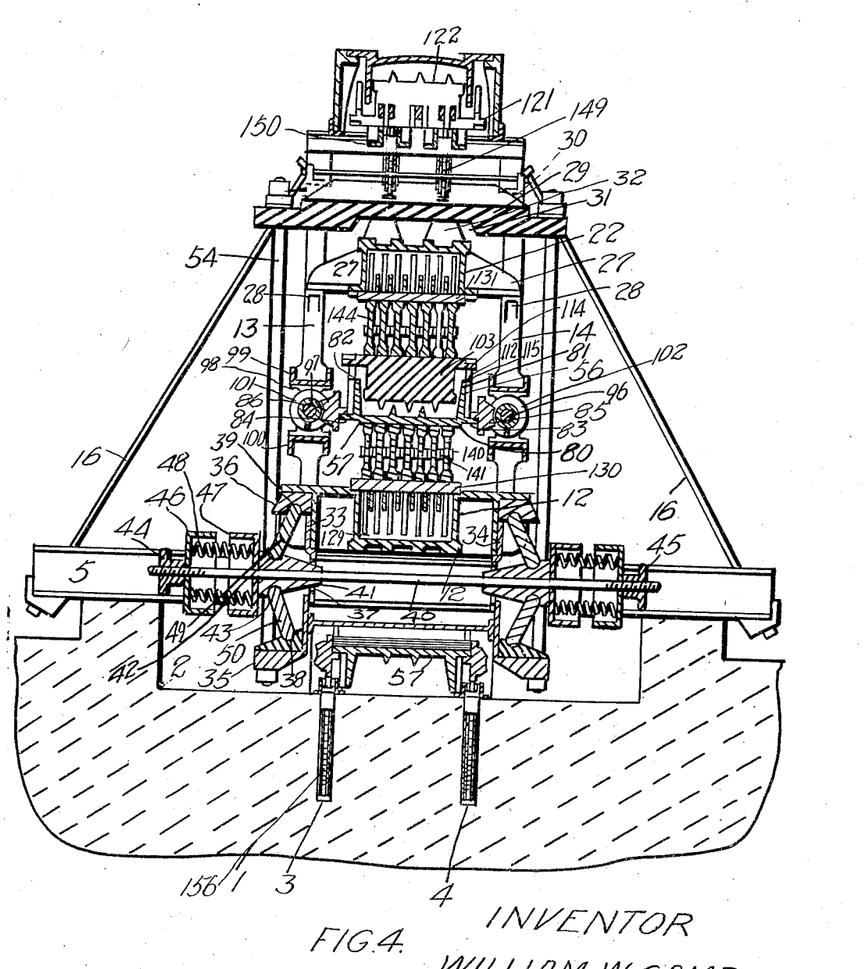
Fig. 4, is an enlarged vertical section on line 4—4 Fig. 1.

The section 57 as will be clearly seen on referring to Fig. 4 is substantially U-shaped in cross section thereby forming a receiving trough for the pulverized peat. 80 is the bottom wall of the section 57 and 81 and 82 the side walls. 83 and 84 are flanges extending laterally from the base of each side wall 81 and 82. On the upper edge of the flanges 83 and 84 are supported internal worm segments 85 and 86 each section 57 being provided with a worm segment at each side. 87 is the main driving shaft provided with a driving pulley 88. 89 is a supplemental shaft mounted in bearings 90 and 91 carried by the frame structure 92. 93 is a sprocket gear mounted upon the driving shaft 87 and 94 is a sprocket gear mounted upon the shaft 89. 95 is a gear pinion secured to the shaft 89. 96 and 97 are shafts journaled in bearings 98 which are carried by longitudinal bars 99 and 100 secured to the standards 13 and 14, 18 and 19 and carrying intermeshing gears 195 and 196. Upon the shafts 96 and 97 are mounted worm gear sections 101 and 102. These sections are preferably spaced apart one from the other on each side of the machine a distance equal to the distance between center and center of the section 57, that is to say the center of each worm section is opposite the center of each conveyer section when they are brought into alinement. As the shafts 96 and 97 are rotated the gears 101 and 102 secured thereto engage the internal gear segments 85 and 86 so as to gradually draw the segments longitudinally and successively through the machine. 103 are a series of compressor sections. The sections 103 are hingedly connected together at 104 so as to form an endless chain mounted upon spider wheels 106 and 107. The spider wheels 106 and 107 are mounted upon shafts 108 and 109 carried in bearings 110 and 111, which bearings are carried by a suitable frame structure such as indicated in Fig. 1.

Figure 2:
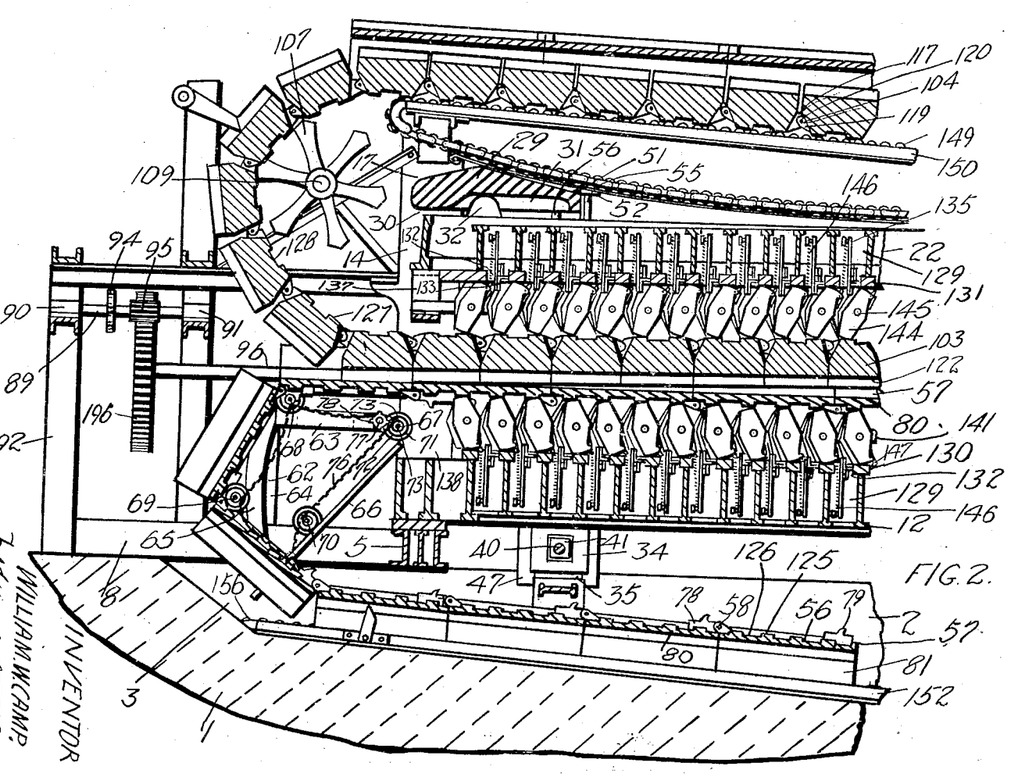
Fig. 2, is an enlarged longitudinal section of the left hand portion of the machine as shown in Fig. 1.
Figures 3, 9, 10:
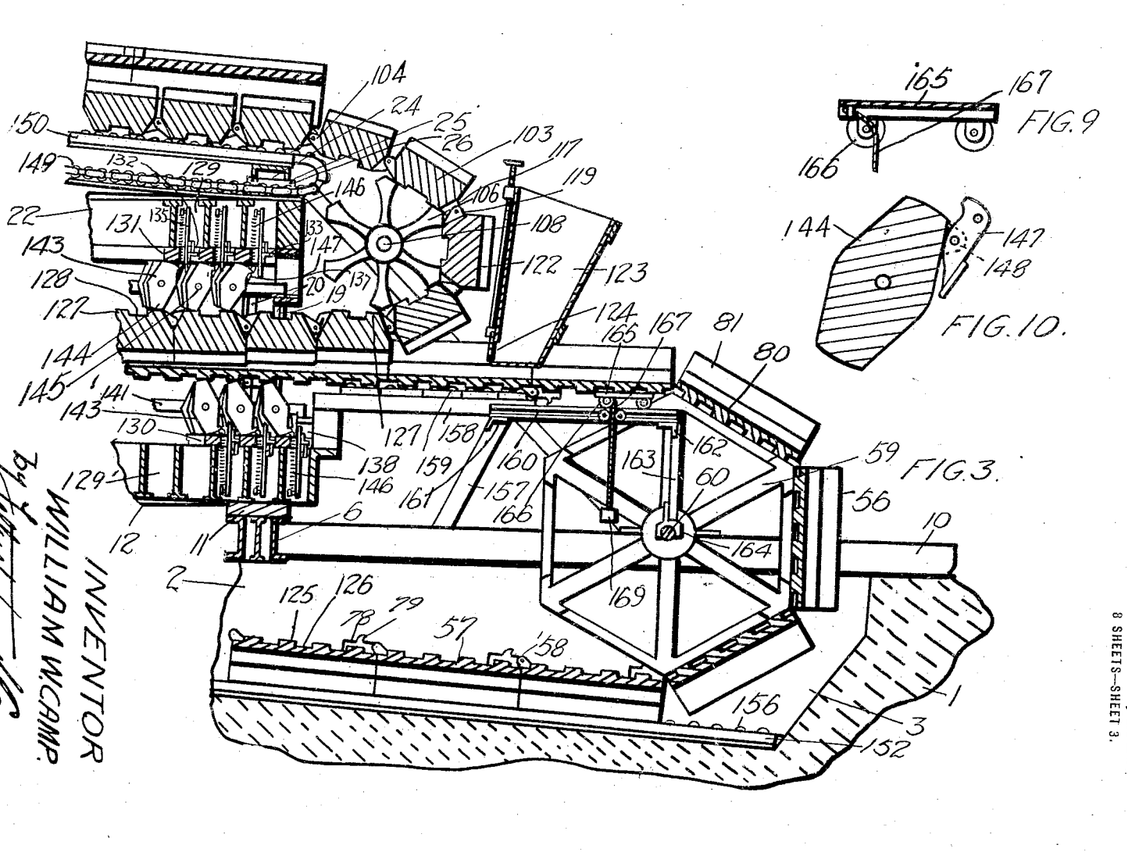
Fig. 3, is an enlarged longitudinal sectional view of the right hand portion as shown in Fig. 1 corresponding to the section shown in Fig. 2.
Fig. 9 is a sectional detail of the traveling carriage whereby the sections of the lower conveyer are supported to travel horizontally into their operative position.
Fig. 10 is a sectional detail of one of the pressure cams.

It will be noted on referring particularly to Fig. 2 that the sections 103 are half the length of the sections 57 of the conveyer 56, so that each pair of compressor sections 103 coöperate with each section 57 of the conveyer 56 so that the pulverized peat is compressed therebetween as will hereinafter be explained. The compressor sections are driven so as to revolve around the spider wheels 106 and 107 by the following means.

Figure 6:
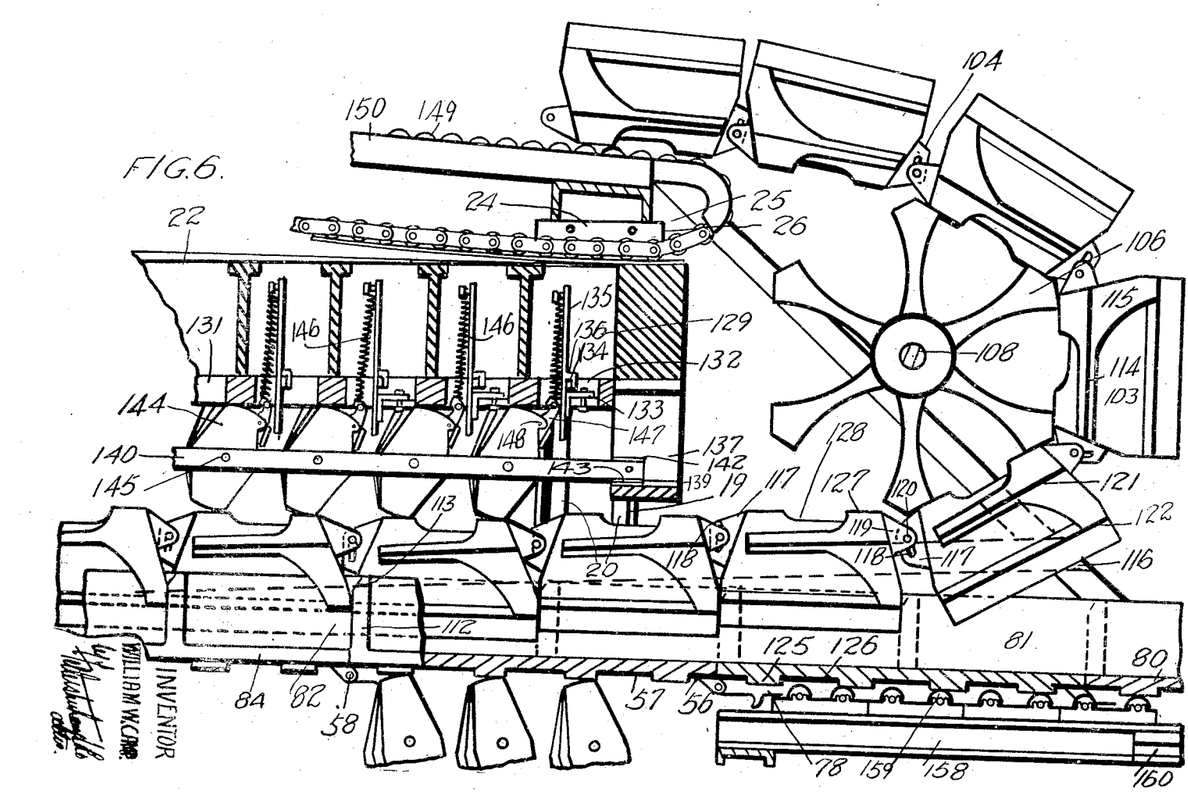
Fig. 6, is a further enlarged sectional view of the right hand end of the pressure beam showing a portion of the pressure chain in elevation and a portion of the conveyer in section.

Upon referring particularly to Fig. 6 it will be seen that each section 57 of the lower conveyer is provided with vertical ribs 112 formed on the vertical walls 81 and 82 of the sections 57, the forward upper corner of the rib 112 being chamfered off at 113. Each section 103 is provided with a rib 114 extending outwardly from each side thereof and from which depend lugs 115 so spaced that, when the sections 103 are brought into alinement with the sections 57, the lug 115 is brought into the engaging position with the ribs 112. It will, therefore, be seen that as the sections 57 are carried forward through the machine they engage the lugs 115 carrying the sections 103 in a similar direction.

It will be readily understood that as the compressor sections 103 pass around the spider 106 and come into contact with the peat that there would be a tendency in the peat to clog between each pair of sections 103. In order to overcome this I have provided the following construction.

116 is an inclined track bar supported in the frame of the machine at each side of the conveyer 56. The hinge connection 104 is formed by a lug 117 having a slot 118 which is set at right angles to the compressing face of the compressor section. The opposing end of the next adjacent section is provided with lugs 119 having a hinge pin 120 extending through the slot 118. The rib 114 is provided with a ledge 121 set at such an incline that when the section is carried around the spider 106 and the ledge 121 into engagement with the track 116 the compressing face 122 of the compressor section is parallel with the lower face of the pressure beam 22 and the opposing ends of each adjacent section are in contact as indicated clearly in Fig. 6. The sections which are supported by the track bars 116 have a stepped relation one to the other as will also be clearly seen by this figure and as the sections 103 are carried downward as they recede from the spider 106 that a shearing action takes place between the abutting end faces of the sections 103 the slot 118 allowing of this movement. By this means it will be readily seen that all danger of peat entering between the sections is avoided.

123 is a feed hopper into which the pulverized peat is thrown. The hopper 123 is provided with a suitable gate valve 124 by which the feed of the peat into the sections 57 of the conveyer 56 is controlled. The hopper 123 fits between the side walls 81 and 82 of the section 57 so that as the conveyer 56 revolves a layer of pulverized peat is deposited in the bottom of these sections and is carried forward into the machine for compressing.

I will now describe the means by which the pressure generated by the pressure beam 22, equalizing beam 29 and compressor springs 48 is distributed and gradually exerted on the layer of peat so that a very gradual pressure is given thereby eliminating the strain which would otherwise occur if the total pressure was given at any one point.

Figure 7:
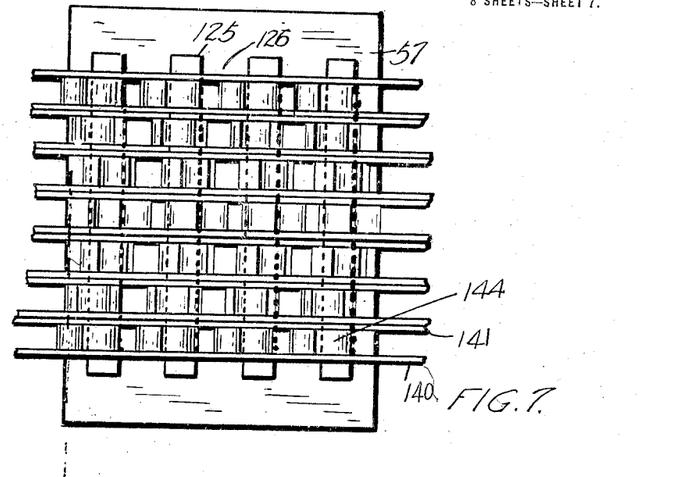
Fig. 7 is an inverted view of one of the sections of the lower conveyer and the pressure cams co-acting therewith.

The lower face of each section 57 is provided with cross ribs 125 separated by intervening recesses 126. Upon referring particularly to Fig. 7 it will be seen that the width of the recesses is slightly greater than the width of the ribs for a purpose which will hereinafter appear. The upper face of the compressor sections 103 are provided with similar cross ribs 127 and intervening recesses 128. The beams 12 and 22 are cored out at 129 to form suitable containing spaces for a purpose which will hereinafter appear.

Figure 5:
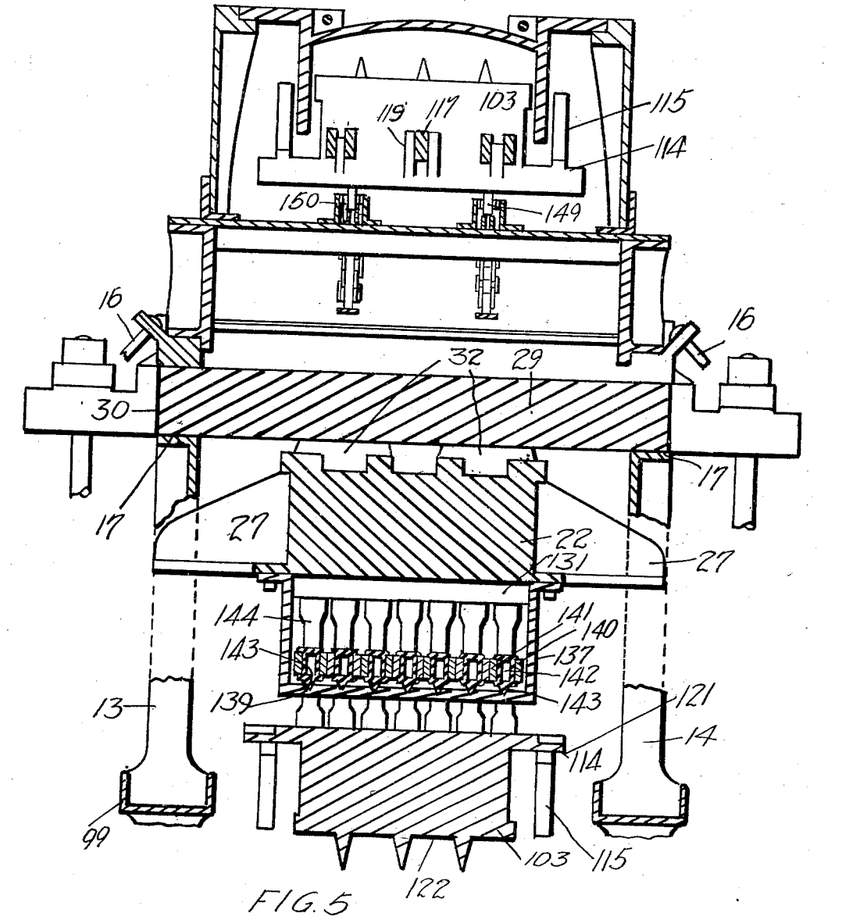
Fig. 5, is an enlarged sectional view on line 5—5 Fig. 1.

130 is a contact plate secured to and carried by the upper face of the beam 12. 131 is a contact plate carried by the lower face of the beam 22. 132 are orifices formed in the contact plates 130 and 131. 133 is an angle plate bolted in the orifices 132, (see Fig. 6). 134 is a cross piece extending across the orifices 132 adjacent to the supporting beam. 135 is a bar having a hook 136 engaging the cross piece 134 as clearly indicated in Fig. 6. 137 is a hanger bracket. A hanger bracket 137 depends from each end of the pressure beam 22. A similar bracket extends upwardly at 138 from each end of the base beam 12. The brackets 137 and 138 are provided with cross grooves 139, (see Fig. 5). 140 and 141 are bars arranged in pairs and extending longitudinally of the machine the said bars being located between the pressure beam 22 and the compressor sections 103 which travel beneath the pressure beam 22, and between the base beam 12 and conveyer sections 57. Each pair of bars 140 and 141 are connected together at each end by castings 142 provided with knife edge portions 143 which slidably fit within the grooves 139. 144 are segmental roller members swingably mounted upon pins 145 journaled in the bars 140 and 141. These segmental rollers are pivotally mounted between the bars 140 and 141 in rows extending longitudinally of the machine. The pivot points of the machine are arranged in a broad V-shaped formation cross wise of the machine so that as the conveyer 56 and compressor members 103 pass through the machine the segmental rollers of each V-shaped set do not engage simultaneously but each longitudinal set engages simultaneously. As the contact face formed by the cross ribs 125 and 127 pass longitudinally of the machine they first engage the center segmental roller member having a rolling contact therewith. It will be understood that the upper or compressor sections are slightly lifted up by the uncompressed peat and the lower or conveyer section slightly forced down by the uncompressed peat. The weight of the beam 22 tends to force the section 103 to travel in a converging direction to the bottom of the conveyer section 56 and that the tendency of the uncompressed peat which is forced into the machine by the engagement of the compressor members 103 with the top of the layer of peat and of the conveyer section 56 with the bottom of the layer of peat is to lift the compressor beam 12 upward. The compressing action of the beam then operates, the layer of peat being gradually pinched together as each successive row of segmental rollers engages with the lower face of the compressor beam and the upper face of the compressor section on one side of the peat and with the upper face of the base beam and the lower face of the conveyer section on the other side of the layer of peat. Each segmental roller as it engages between the opposing contact faces, formed on one side of the peat by the compressor beam and the cross ribs of the compressor sections and on the other side of the peat by the cross ribs of the conveyer sections and the face of the base beam, is rolled forward each longitudinal set of the segmental rollers acting in unison. As they roll forward they serve to maintain the sections 56 and 103 in their normal direction of travel irrespective of the thickness of the layer of the uncompressed peat and, therefore, the uncompressed peat as it is carried longitudinally is gradually forced by the sections as they converge into a gradually smaller space thereby compressing it into a solid sheet as it emerges from the opposite end of the machine.

By arranging the segmental rollers in V-form crosswise of the machine they are carried successively into the compressing position from the center out and therefore produce a lateral squeezing action outward from the medial line of the peat tending to spread the sheet of peat laterally in both directions.

It will be understood that as the longitudinal set of segmental rollers are supported between a pair of longitudinal bars 140 and 141 these bars are moved in a corresponding direction gradually drawing the springs 146 into tension.

Immediately the rolling contact of the cam is complete the forward travel of the conveyer or of the compressor section carries the contact face of the cam out of contact with the contact ribs of the compressor sections and conveyer sections so that the cam enters the recess between each pair of contact ribs and such recess being wider than the width of the ribs allows the segmental rollers to roll back upon the contact plates of the beams 12 and 22 to their normal position ready to reëngage with the next succeeding contact rib, the bars 140 and 141 being carried in the reverse direction during this operation.

The swinging member 147 mounted between the lugs 148 of the segmental cam rollers and to which the springs 146 are connected merely serve as stops to limit the return movement of the segmental sections. 149 is an endless roller chain carried on suitable channel ways 150 adapted to support the compressor sections as they pass over the compressor beam 22 between the spider wheels 106 and 107. The conveyer sections 56 are similarly supported by the roller chain 156 supported in the channel 152 located in the channel ways 3 of the concrete substructure.

In order to support the sections 57 of the conveyer 56 as they travel from the spider 59 into position so as to be supported by the segmental rollers 144 I have provided the following device.

157 is a frame structure carried by the longitudinal beams 9 and 10. From the frame structure 157 are supported bars 158 in which are journaled rollers 159 upon which the sections 57 travel after they have received the peat. 160 are rails supported at one end on the cross bars 161 forming part of the frame 157 and at the opposite end upon cross bars 162 carried by the standard bar 163 which is provided at its lower end with a fork 164 which rests upon the shaft 60 upon which the spider 59 is mounted. 165 is a carriage provided with wheels 156 mounted upon the rails 160. 167 is a cord secured to the carriage 165 at 168 in proximity to the rear end. The cord 167 passes over the axle of the rear wheels 166 and is provided at its lower end with a weight 169. As each section 57 travels forward the carriage is carried forward with the section 57 supporting the weight of the section until it is received by the rollers 159 which form a bearing support slightly higher than the top of the carriage 165. By the forward movement of the carriage 165 the weight 169 is drawn upward. Immediately the carriage is relieved of the weight of the section it is carried back by the weight 169 so as to support the next succeeding section in its forward movement.

The pressure members 103 may be provided on their lower faces with longitudinally extending parallel V-shaped ribs and the conveyer sections with similar ribs opposing the aforesaid ribs and arranged intermediately between them. When the pressure members and conveyer sections are forced together in their final pressure position the edges of the ribs come into contact with the opposing surfaces of the pressure members and conveyer members, in other words, they cut completely through the compressor body so as to divide it into longitudinally extending bar sections which is a suitable form for use for fuel.

Incidentally the cutting of the peat into these bar sections by the wedges exerts a lateral pressure through the peat as the wedges are forced into the peat which thereby serves to insure an even density through the peat when discharged as a finished product which is a condition very desirable.

From this description it will be seen that I have devised a machine particularly adapted for compressing peat and like substances, which will impart to the layer of peat a great pressure which is graduated both in a longitudinal and lateral direction whereby the pressure given is so distributed as to prevent any undue strain being given to any part of the machine.

It will of course be understood that the peat as it is fed through the machine is heated to the required temperature and also the pressure surfaces which contact therewith. This is not described in detail as it is common practice.

What I claim as my invention is.

1. A press comprising a bed, a pressure beam swingably supported at one end above the bed, means for feeding a layer of pulverized material between the bed and the pressure beam, and means for transmitting the pressure of the beam on to the layer of pulverized material to compress it into an even compact sheet.

2. A press comprising a bed, a pressure beam swingably supported at one end above the bed, means for feeding a layer of pulverized material between the bed and the pressure beam and means operated by the weight of the beam for producing a succession of repeated pressures upon the pulverized material as it travels longitudinally beneath the beam.

3. A press comprising a bed, a pressure beam swingably mounted at one end above the bed, means for feeding a layer of pulverized material longitudinally between the bed and the pressure beam, and means for transmitting the pressure of the beam to the pulverized material in a series of pressures successively operating thereupon, and means for distributing the pressure in pressures operating successively laterally to each side of the medial line of the layer of pulverized material.

4. A press comprising a bed, a pressure beam swingably supported at one end above the bed, means for feeding a layer of pulverized material between the bed and the pressure beam, means for transmitting pressure from the beam to the pulverized material and means for distributing such pressure so as to be gradually exerted outward from a medial line extending through the layer of material under pressure.

5. A press comprising a bed, a pressure beam swingably supported at one end above the bed, an endless conveyer forming a traveling trough extending between the bed and the pressure beam, means for imparting movement to the conveyer, means for feeding pulverized material into the sections of the conveyer whereby it is carried longitudinally through the machine in layer form, a converging series of pressure members adapted to enter the sections of the conveyer and to engage the upper face of the layer of material and means for transmitting the pressure exerted by the pressure beam so that the conveyer sections and pressure sections are gradually forced together as they travel longitudinally between the bed and the pressure beam.

6. A press comprising a bed, a pressure beam swingably supported at one end above the bed, an endless conveyer forming a traveling trough extending between the bed and the pressure beam, means for imparting movement to the conveyer, means for feeding pulverized material into the sections of the conveyer whereby it is carried longitudinally through the machine in layer form, a converging series of pressure members adapted to enter the sections of the conveyer and to engage the upper face of the layer of material and means for transmitting the pressure exerted by the pressure beam so that the conveyer sections and pressure sections are forced together as they travel longitudinally between the bed and the pressure beam, and means for distributing the pressure so that it is transmitted in a series of minor pressures operated successively longitudinally of the machine.

7. A press comprising a bed, a pressure beam swingably supported at one end above the bed, an endless conveyer forming a traveling trough extending between the bed and the pressure beam, means for imparting movement to the conveyer, means for feeding pulverized material into the sections of the conveyer whereby it is carried longitudinally through the machine in layer form, a series of pressure members adapted to enter the sections of the conveyer and to engage the upper face of the layer of material, means for transmitting the pressure exerted by the pressure beam so that the conveyer sections and pressure sections are forced together as they travel longitudinally between the bed and the pressure beam, and means for distributing the pressure so that it is transmitted in a series of minor pressures operated successively longitudinally of the machine and also by a series of minor pressures operating successively and extending crosswise of the machine.

8. A press comprising a bed, a pressure beam swingably supported at one end above the bed, an endless conveyer forming a traveling trough extending between the bed and the pressure beam, means for imparting movement to the conveyer, means for feeding pulverized material into the sections of the conveyer whereby it is carried longitudinally through the machine in layer form, a series of pressure members adapted to enter the sections of the conveyer and to engage the upper face of the layer of material and means for transmitting the pressure exerted by the pressure beam so that the conveyer sections and pressure sections are forced together as they travel longitudinally between the bed and the pressure beam, means for distributing the pressure so that it is transmitted in a series of minor pressures operated successively longitudinally of the machine and also by a series of minor pressures operating successively outward from the medial line extending longitudinally of the machine.

9. A press comprising a bed, a pressure beam swingably supported at one end above the bed, an endless conveyer formed by a series of trough like sections traveling between the bed and the pressure beam, means for driving the endless conveyer, a series of pressure members traveling in unison with the conveyer so that the sections of the pressure members oppose each section of the conveyer, cross ribs formed on the lower face of each conveyer section and spaced equi-distant apart a distance greater than the width of the cross rib, similar cross ribs formed upon the inner face of the pressure members, a series of segmental roller sections having diametrically opposite concentric faces interposed between the pressure beam and the pressure members, and a series of segmental rollers having diametrically opposite concentric faces interposed between the bed and the conveyer sections, the concentric faces of one series of segmental rollers engaging the bed and the cross ribs of the conveyer and having rolling contact therewith during the travel of the conveyer and the concentric face of the other series having contact with the lower face of the pressure beam and the cross ribs of the pressure members and means for carrying the segmental roller members back to their normal position as they are brought opposite the intervening space between the cross ribs of the conveyer and the pressure members ready to reëngage with the next successive cross rib.

10. A press comprising a bed, a pressure beam swingably supported at one end above the bed, an endless conveyer formed by a series of trough like sections traveling between the bed and the pressure beam, means for driving the endless conveyer, a series of pressure members traveling in unison with the conveyer so that the sections of the pressure members oppose each section of the conveyer, cross ribs formed on the lower face of each conveyer section and spaced equi-distant apart a distance greater than the width of the cross rib, similar cross ribs formed upon the inner face of the pressure members, a series of segmental roller sections having diametrically opposite concentric faces interposed between the pressure beam and the pressure members, and a series of segmental rollers having diametrically opposite concentric faces interposed between the bed and the conveyer sections, the concentric faces of one series of segmental rollers engaging the bed and the cross ribs of the conveyer and having rolling contact therewith during the travel of the conveyer and the concentric face of the other series having contact with the lower face of the pressure beam and the cross ribs of the pressure members, resilient means drawn into tension by the rolling action of the segmental roller members and released by the entrance of the roller members into the rib interspaces during the forward travel of the conveyer and pressure members whereby the rolling action of the segmental rollers is reversed to their normal position.

11. A press comprising a bed, a pressure beam swingably supported at one end above the bed, an endless conveyer comprising a series of trough like sections adapted to pass between the bed and the pressure beam, means for feeding pulverized material into the sections of the conveyer to pass through the machine, an endless chain of pressure members adapted to be brought successively into a position to oppose the sections of the conveyer, a series of cross ribs formed on the lower face of the conveyer section and spaced equi-distant apart a distance greater than the width of the ribs, similar cross ribs formed on the upper face of the opposing pressure members, a series of segmental roller members having diametrically opposite concentric faces interposed between the bed and the conveyer sections and between the pressure beam and pressure sections, and means for concentrically mounting the segmental roller members so that they are arranged in broad V-shaped form extending crosswise of the machine whereby they are successively brought into rolling contact from the center member outward with the cross ribs of the conveyer and the pressure members and means for reversing the rolling action of the segmental rollers when they are released from the cross ribs by the forward travel of the conveyer and the pressure members.

12. A press comprising a bed, a pressure member swingably supported at one end above the bed, an endless conveyer formed by a series of trough like sections adapted to pass between the bed and the pressure beam and into which pulverized material is adapted to be fed, an endless chain of pressure members adapted to be brought successively into a position opposing the sections of the conveyer, contact cross ribs formed on the lower face of the sections of the conveyer and on the upper face of the sections of the pressure members and spaced equi-distant apart a distance greater than the width of the ribs, a series of longitudinal bars arranged in pairs between the pressure beam and the pressure members and between the bed and the conveyer sections, a longitudinal series of segmental roller members pivotally mounted between each pair of longitudinal bars and arranged in V form extending crosswise of the machine, and means for driving the conveyer and chain of pressure members so as to travel longitudinally through the machine.

13. A press comprising a bed, a pressure beam swingably supported at one end above the bed, means for feeding a layer of pulverized material longitudinally between the bed and the pressure beam, means for transmitting the pressure of the beam against each side of the layer of material, and equalizing means for preventing the lateral twisting of the pressure beam when exerting pressure upon the material.

14. A press comprising a bed, a pressure beam swingably supported at one end above the bed, means for feeding a layer of pulverized material longitudinally between the bed and the pressure beam, means for transmitting the pressure of the beam against each side of the layer of material, an equalizing beam swingably mounted at its outer end and bearing in proximity to its free end upon the pressure beam, and yieldable means for tying the free ends of the equalizing beam to the bed.

15. A press comprising a bed, a pressure beam swingably mounted at one end above the bed and having upwardly extending fulcrum projections in proximity to its free end, means for feeding a layer of pulverized material longitudinally between the bed and the pressure beam, an equalizing beam swingably mounted in proximity to the free end of the pressure beam and bearing upon the fulcrum projection of the pressure beam, a convex bearing portion at each side of and at the outer end of the equalizing beam, a bar having a concave recess bearing upon each of the convex portions, tie rods extending downwardly from each end of the bar, yieldable means for resisting the upward movement of the tie rods, and means for transmitting the pressure exerted by the pressure beam against each face of the layer of material as it is fed through the machine.

16. A press comprising a bed, a pressure beam swingably supported at one end above the bed, an endless conveyer comprising a series of trough like sections adapted to pass longitudinally between the bed and the pressure beam and into which the pulverized material is adapted to be fed, concave racks secured upon each side of the conveyer section, a shaft journaled in a suitable frame extending to each side of the conveyer, worm sections mounted upon each shaft and engaging the concave racks of the conveyer, a chain of pressure members mounted to revolve and adapted to be brought successively into a position opposing the sections of the conveyer, projection portions extending from the sections of the conveyer, and co-acting projections extending from the sections of the pressure members and with which the projections of the conveyer engage to form the driving connection between the conveyer and the chain of pressure sections, and means for transmitting the pressure of the pressure beam against the lower face of the conveyer and the upper face of the pressure members.

17. A press comprising a bed, an endless conveyer comprising a series of trough like sections into which pulverized material is adapted to be fed, driving means for rotating the conveyer, a pressure beam swingably supported at one end above the bed, a chain of pressure members revolubly mounted and adapted to be brought successively into an opposing position with the sections of the conveyer, means for rotating the chain of pressure members in unison with the conveyer, means for transmitting the pressure of the beam against the lower face of the conveyer and the upper face of the pressure member, and means whereby the pressure members are lowered on to the bed of material so that the ends of the sections are in contact and move in parallel relation into the pressure position.

18. A press comprising a bed, a pressure beam swingably supported at one end above the bed, a conveyer comprising a series of trough like sections adapted to receive pulverized material, a chain of pressure members mounted to rotate in unison with the endless conveyer, ribs located on the sides of the pressure sections and extending at an incline to the face of the section, inclined track bars supported at each side of the conveyer, and upon which the ribs of the pressure sections bear so as to gradually lower them on to the pulverized material within the conveyer, and a flexible connection between the sections forming the chain of pressure members.

19. In a press, a bed, a pressure member opposing the bed, flexible opposing travelers extending between the bed and the pressure members and between which the layer of material to be pressed is interposed, cross ribs extending across each of the travelers, roller members supported to contact with the pressure members and ribs of the upper traveler, and roller members supported to contact with the bed and the ribs of the lower traveler whereby they are rolled in one direction by the forward movement of the travel of the travelers, and means for reversing the rolling action when the roller members are brought opposite the spaces separating the ribs.

20. In a press, a bed, pressure members opposing the bed, flexible opposing travelers extending between the bed and pressure members and between which the material to be pressed is interposed, cross ribs extending across the upper travelers and separated by interposed recesses, roller members supported to contact with the pressure members and ribs of the upper traveler to roll in one direction during the forward travel of the traveler when in contact with the ribs and in the reverse direction when opposite the recess interspaces between the ribs.

21. In a press, a bed, pressure members opposing the bed, flexible opposing travelers extending between the bed and pressure members and between which the material to be pressed is interposed, cross ribs extending across the upper travelers and separated by interposed recesses, roller members supported to contact with the pressure members and ribs of the upper traveler to roll in one direction during the forward travel of the traveler when in contact with the ribs and in the reverse direction when opposite the recess interspaces between the ribs, and means opposing the pressure of the aforesaid roller members located between the bed and the lower traveler.

22. In a press, an endless conveyer comprising a series of trough like sections hingedly connected together and into which the material to be pressed is adapted to be fed, a chain of pressure members adapted to successively enter the trough like sections of the conveyer and travel in unison with the conveyer in a longitudinal converging direction thereof, means for successively pressing the sections of the pressure members and sections of the conveyer together as they travel longitudinally of the press, and means entering the pulverized material as the pressure members and conveyer sections are forced together for exerting a lateral pressure within the mass.

23. In a press, an endless conveyer comprising a series of trough like sections hingedly connected together, a chain of pressure members supported to revolve in unison with the conveyer and in a longitudinally converging direction thereof so as to bear against the upper face of the material to be pressed in each section, means for exerting a series of repeated pressures to gradually force the pressure members and conveyer sections together as they travel in a converging direction, and wedging means carried by the opposing faces of the conveyer sections and pressure sections adapted to enter the pulverized material and force it laterally.

24. In a press, an endless conveyer comprising a series of trough like sections hingedly connected together, a chain of pressure members supported to revolve in unison with the conveyer and in a longitudinally converging direction thereof so as to bear against the upper face of the material to be pressed in each section, means for exerting a series of repeated pressures to gradually force the pressure members and conveyer sections together as they travel in a converging direction, and wedging means carried by the opposing faces of the pressure sections and conveyer sections and arranged alternately so as to produce a lateral pressure therebetween.

25. In a press, an endless conveyer comprising a series of trough like sections hingedly connected together, a chain of pressure members supported to revolve in unison with the conveyer and in a longitudinally converging direction thereof so as to bear against the upper face of the material to be pressed in each section, means for exerting a series of repeated pressures to gradually force the pressure members and conveyer sections together as they travel in a converging direction, and wedge strips carried by the bottom of the pressure sections and wedging strips carried by the opposing faces of the conveyer sections and arranged alternately therewith and adapted to exert a lateral pressure between the wedge strips of the pressure sections and the wedge strips of the conveyer sections as they are forced in a pulverized material.

WILLIAM WATSON CAMP.